US010303587B2

(12) United States Patent
M et al.

(10) Patent No.: US 10,303,587 B2
(45) Date of Patent: May 28, 2019

(54) SYSTEM AND METHOD FOR GENERATING REGRESSION TEST SUITE

(71) Applicant: HCL TECHNOLOGIES LIMITED, Noida, Uttar Pradesh (IN)

(72) Inventors: Hareendran M, Tamil Nadu (IN); Rajesh Babu Suraparaju, Tamil Nadu (IN)

(73) Assignee: HCL TECHNOLOGIES LIMITED (IN)

( * ) Notice: Subject to any disclaimer, the term of this patent is extended or adjusted under 35 U.S.C. 154(b) by 0 days.

(21) Appl. No.: 16/041,558

(22) Filed: Jul. 20, 2018

(65) Prior Publication Data
US 2019/0034323 A1    Jan. 31, 2019

(30) Foreign Application Priority Data

Jul. 27, 2017   (IN) .............................. 201711026793

(51) Int. Cl.
| | | |
|---|---|---|
| G06F 9/44 | (2018.01) | |
| G06F 11/36 | (2006.01) | |
| G06F 8/75 | (2018.01) | |
| G06F 8/71 | (2018.01) | |

(52) U.S. Cl.
CPC ............ *G06F 11/3684* (2013.01); *G06F 8/71* (2013.01); *G06F 8/75* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,778,169 | A | 7/1998 | Reinhardt |
| 7,490,319 | B2 | 2/2009 | Blackwell et al. |
| 2008/0126867 | A1 | 5/2008 | Pandarinathan et al. |
| 2012/0042302 | A1 | 2/2012 | Sikandar et al. |
| 2014/0282411 | A1* | 9/2014 | Liemandt ............ G06F 11/3672 717/124 |

FOREIGN PATENT DOCUMENTS

GB    2460407 A    2/2009

OTHER PUBLICATIONS

Xiao Qu "Configuration Selection Using Code Change Impact Analysis for Regression Testing" 2012.
August Shi et. al. "Optimizing Test Placement for Module-Level Regression Testing" 2010.

* cited by examiner

*Primary Examiner* — Qamrun Nahar
(74) *Attorney, Agent, or Firm* — Hayes Soloway P.C.

(57) ABSTRACT

The present disclosure relates to systems and methods to generate a test suite for regression testing. The method may comprise comparing a set of current code blocks with a set of historical code blocks to identify a set of modified code blocks from the set of historical code blocks associated with a software application. Further, the set of modified code blocks may be analysed to determine type of modification associated with each modified code block. Further, the method may comprise determining a set of impacted code blocks from the set of modified code blocks based on analysis of the type of modification associated with each modified code block. Further, the method may comprise identifying and prioritizing a subset of test cases from a set of test cases based on analysis of the set of impacted code blocks, thereby generating a regression test suite for regression testing of the current build.

13 Claims, 3 Drawing Sheets

SYSTEM AND METHOD FOR GENERATING REGRESSION TEST SUITE

CROSS-REFERENCE TO RELATED APPLICATIONS AND PRIORITY

The present application claims the benefit of Indian Complete Patent Application No. 201711026793 filed on 27 Jul. 2017 the entirety of which is hereby incorporated by reference.

TECHNICAL FIELD

The present disclosure in general relates to the field of testing. More particularly, the present invention relates to a system and method for generating a regression test suite.

BACKGROUND

Testing of a software application is one of the most critical phase of any Software Development Lifecycle (SDLC). With the development in Information Technology, software applications are launched more frequently. Nowadays, new versions of the existing software applications are launched in the market. In order to launch new versions of the software application in an effective manner, developers are continuously making efforts in order to reduce the turn-around time for development and testing of the latest software application. Considering the number of available resources and available time, at the time of new release of the software application, only a few selected test cases are used in order to conduct the regression testing of the software application.

In typical product development life cycle, on release of each version, it is important to identify whether the regression test case collection is sufficient enough to ensure the quality and to identify the new case requirements. Due to time limitations and other constraints, it may not be feasible to execute all test cases. At the same time, by selecting a subset of test cases randomly, the quality of the tests may be compromised. There are various approaches right now available and followed for identifying an optimized test case list.

One of such approach is to identify the changes in modules/methods of current builds as compared to previous builds at source code level and identify test cases based on the changes. For identifying the affected modules/methods of current build/versions, the current build of the software application to be tested is compared with the previous/historical build. Further to the comparison, the module/method is categorized as modified methods, deleted methods, newly added methods, etc. Furthermore, associated test cases of the modified methods are considered for execution. Furthermore, new test cases are added for the methods marked as newly added methods. This approach has some limitations. These limitations include the absence of test case associations with newly added methods. However, the new method may have different levels of relationship with already existing methods. Hence, test cases associated with related methods are relevant for the corresponding methods of new build. Some examples of such type are as follows:

Some methods in a newly added method list might be overridden methods of existing methods
Some methods in a newly added method list might be renamed methods of existing methods
Some methods in a newly added method list might be extended methods of existing methods
Some methods in a newly added method list might be derived methods of existing methods However, in this approach, the association between test case and method is predefined. As a result, methods of new build/version are affected by comparing the new build with the previous build. However, due to the complex relationship between methods, identification of affected methods is challenging.

SUMMARY

The present systems and methods to generate a test suite for regression testing are described. It is to be understood that this application is not limited to the particular systems and methodologies described, as there can be multiple possible embodiments that are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for tuning and deploying an analytical model over the target eco-system. This summary is not intended to identify essential features of the claimed subject matter nor is it intended for use in determining or limiting the scope of the claimed subject matter.

In one implementation, a method to generate a test suite for regression testing is illustrated. The method may comprise comparing, by a processor, a set of current code blocks with a set of historical code blocks to identify a set of modified code blocks from the set of historical code blocks. The set of current code blocks may correspond to a current build of a software application and the set of historical code blocks correspond to at least one historical build of the software application. Further, the method may comprise analyzing the set of modified code blocks to determine a type of modification associated with each modified code block. Further, the method may comprise determining a set of impacted code blocks from the set of modified code blocks based on analysis of the type of modification associated with each modified code blocks. Further, the method may comprise identifying a subset of test cases from a set of test cases based on analysis of the set of impacted code blocks. In one embodiment, the set of test cases is configured to test the set of modified code blocks and the subset of test cases is configured to test the set of impacted code blocks. Further, the method may comprise prioritizing the subset of test cases based on the type of modification associated with each impacted code block thereby generating a regression test suite for regression testing of the current build.

In another implementation, a system to generate a test suite for regression testing is illustrated. The system comprises a memory and a processor coupled to the memory, further the processor is configured to execute programmed instructions stored in the memory. In one embodiment, the processor may execute programmed instructions stored in the memory for comparing a set of current code blocks with a set of historical code blocks to identify a set of modified code blocks from the set of historical code blocks. The set of current code blocks may correspond to a current build of a software application and the set of historical code blocks correspond to at least one historical build of the software application. Further, the processor may execute programmed instructions stored in the memory for analyzing the set of modified code blocks to determine a type of modification associated with each modified code block. Further, the processor may execute programmed instructions stored in the memory for determining a set of impacted code blocks from the set of modified code blocks based on analysis of the type of modification associated with each modified code blocks. Further, the processor may execute programmed instructions stored in the memory for identifying a subset of test cases from a set of test cases based on analysis of the set of impacted code blocks. In one embodiment, the set of test cases is configured to test the set of modified code blocks and the subset of test cases is configured to test the set of impacted code blocks. Further, the processor may execute programmed instructions stored in the memory for prioritizing the subset of test cases based on the type of modification associated with each impacted code block thereby generating a regression test suite for regression testing of the current build.

In yet another implementation, a computer program product having embodied computer program to generate a test suite for regression testing is disclosed. The program may comprise a program code for comparing a set of current code blocks with a set of historical code blocks to identify a set of modified code blocks from the set of historical code blocks. The set of current code blocks may correspond to a current build of a software application and the set of historical code blocks correspond to one or more historical builds of the software application. The program may comprise a program code for analyzing the set of modified code blocks to determine a type of modification associated with each modified code block. The program may comprise a program code for determining a set of impacted code blocks from the set of modified code blocks based on analysis of the type of modification associated with each modified code blocks. The program may comprise a program code for identifying a subset of test cases from a set of test cases based on analysis of the set of impacted code blocks. In one embodiment, the set of test cases is configured to test the set of modified code blocks and the subset of test cases is configured to test the set of impacted code blocks. The program may comprise a program code for prioritizing the subset of test cases based on the type of modification associated with each impacted code block thereby generating a regression test suite for regression testing of the current build.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "comparing", "analyzing", "determining", "identifying", "prioritizing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and method to generate a test suite for regression testing is now described. The disclosed embodiments of the system and method to generate a test suite for regression testing are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure to generate a test suite for regression testing is not intended to be limited to the embodiments illustrated, but is to be accorded the widest scope consistent with the principles and features described herein.

The present subject matter relates to identifying the affected code modules/methods based on relationship analysis over version/build comparison of a software application. The approach enables identifying the best regression test suite for the current build/version of the software application. Furthermore, the system is configured to perform analysis on the degree of change in the software builds to get recommendations for the new test case in order to test the current software build.

Furthermore, level of changes in modified method list may vary with respect to its significance. Test cases association may need to prioritize based on the significance of the level of testing. Also the change analysis helps in identifying the requirement of new test cases. In one embodiment, change analysis bay classify the changes as:

Comment line change: Sometimes changes are there only in comment lines or empty lines, priority of these test may be kept lowest as it will not affect any functionality.

Declaration Changes: In the changed methods, if the changes are only in declaration(s) of one/some elements, priority of these test can be relatively low as it may not affect any functionality. Also in this case there will be any need to add new test cases for these methods.

Changes in Exception: In the changed methods, if the changes are only in exception sections, the impact may be on negative test cases. Positive test cases may not have any impact. Hence, priority can be deciding accordingly. Also in this case, new cases are added only for negative scenario.

Changes in definition: In the changed methods, if the changes are only in definition sections, the impact may be on functionality. Hence, positive test cases need to consider as impacted. Hence, priority can be deciding accordingly. Also in this case, new cases to be added for positive scenario.

The proposed new approach applies a method relationship analysis for rightly identifying the affected methods and Impact significance analysis for prioritizing the identified test suites and recommend the new test case requirement.

In one embodiment, the system is configured to analyse a base build. The base build may correspond to one or more previous versions of the software application under development, based on which the regression suite is generated. Furthermore, the current/target build is the new/latest version of the software application which needs to be tested. In one embodiment, a set of test cases is developed for testing base build. Furthermore, a base build repository may be configured to maintain the methods of the base build. Furthermore, mapping information of Methods with Test cases is also maintained by the system. Once the mapping is stored, the system is configured to identify the regression test suite for the target build based on the build comparison and Method-test case mapping of the base build.

In one embodiment, the steps for generating the regression test suite are as follows:

Get the methods of the target build by analyzing the target build.

Perform build comparison between target build and base build to identify:

The newly added methods: Methods available in target build, but not in base build.

Modified methods: Methods available in both base and target build.

Deleted Methods: Methods available in Based build but not in target build.

Perform method relationship analysis to identify the relationship of each method of Target build with the method(s) of the base build. Following are some relationships those can occur and need to be considered for identifying the impacted methods:

Derived methods: New methods in Target build are some derived methods of some methods exist in the base build. Hence, the base methods and other derived methods in base build need to be considered in the list of impacted methods Overridden Methods: New methods in Target build are overridden methods of a method existing in the base build. Hence sibling methods in base build need to be considered in the list of impacted methods.

Name changes Methods: New methods in Target build are just name of signature change of some methods existing in the base build. Hence, the corresponding methods in base build need to be considered in the list of impacted methods Modified Methods: For all modified methods, the corresponding methods in the based build need to be considered in the impacted method list.

With the help of method relationship analysis, performed above, all the impacted methods of the base build may be identified.

The system is further configured to identify all test cases corresponds to the impacted methods with the help of "Method-Test case mapping". The set of test cases identified as the impacted test cases can be consider as master set for regression testing.

However, because of the time and other constraints, it may not be feasible to execute all the identified test cases. Hence, the system is configured to perform change impact analysis for each method of target build to identify the priority or severity of the changes so that regression test case can be prioritized and selected based on the constraints.

Following are some sample changes those can influence the test case selection:

Comments only changes: In the changed methods, if the changes are only in comment lines, priority of these test can be relatively low as it will not affect any functionality. Also in this case there is no need to add new test cases for these methods.

Declaration Changes: In the changed methods, if the changes are only in declaration(s) of one/some elements, priority of these test can be relatively low as it will not affect any functionality. Also in this case there is no need to add new test cases for these methods Changes in Exception: In the changed methods, if the changes are only in exception sections, the impact will be on negative test cases. Positive test cases may not have any impact. Hence, priority can be deciding accordingly. Also in this case, new cases to be added only for negative scenario.

Changes in definition: In the changed methods, if the changes are only in definition sections, the impact will be on functionality. Hence. Positive test cases need to consider as impacted. Hence, priority can be deciding accordingly. Also in this case, new cases are needed to be added for positive scenario.

Based on the different types of analysis the revised, reprioritized regression test case suite may be created by the system. Also the system is configured to will create recommendations for new test case requirements. Further, the network implementation of system configured to generate a test suite for regression testing is illustrated with FIG. 1.

Figure 1:
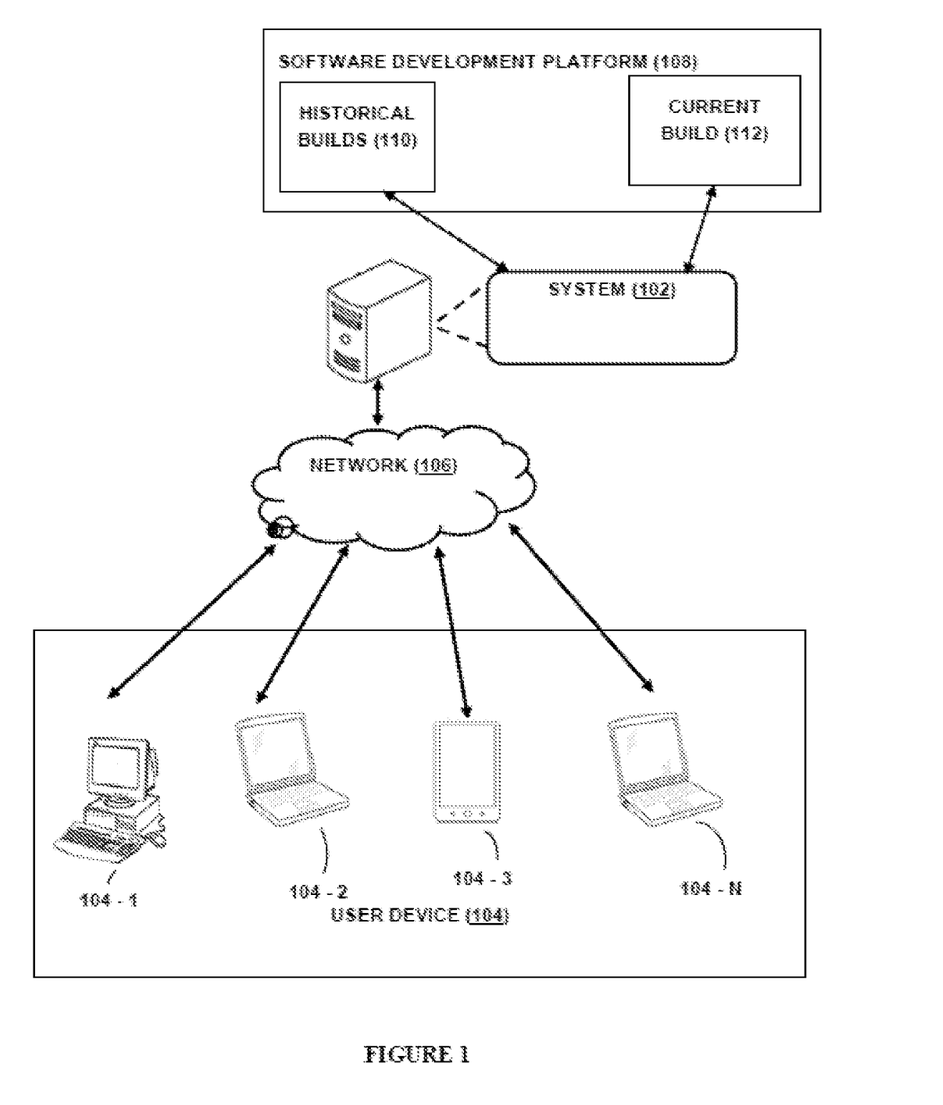
FIG. 1 illustrates a network implementation of a system configured to generate a test suite for regression testing, in accordance with an embodiment of the present subject matter.

Referring now to FIG. 1, a network implementation 100 of a system 102 for generate a test suite for regression testing is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a server. Further, the system 102 may be implemented in a cloud network. The system 102 may further be configured to communicate with a software development platform 108. The software development platform 108 may be configured to maintain historical versions/builds 110 and current build/version 112 of the software application under development.

Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to compare a set of current code blocks with a set of historical code blocks to identify a set of modified code blocks from the set of historical code blocks. The set of current code blocks may correspond to the current build 112 of a software application and the set of historical code blocks correspond to at least one historical build 110 of the software application. Further, the system 102 may analyse the set of modified code blocks to determine a type of modification associated with each modified code block. Further, the system may determine a set of impacted code blocks from the set of modified code blocks based on analysis of the type of modification associated with each modified code blocks. Further, the system 102 may identify a subset of test cases from a set of test cases based on analysis of the set of impacted code blocks. In one embodiment, the set of test cases is configured to test the set of modified code blocks and the subset of test cases is configured to test the set of impacted code blocks. Further, the system 102 may prioritizing the subset of test cases based on the type of modification associated with each impacted code block thereby generating a regression test suite for regression testing of the current build. Further, the system configured to generate a test suite for regression testing is elaborated with respect to FIG. 2.

Figure 2:
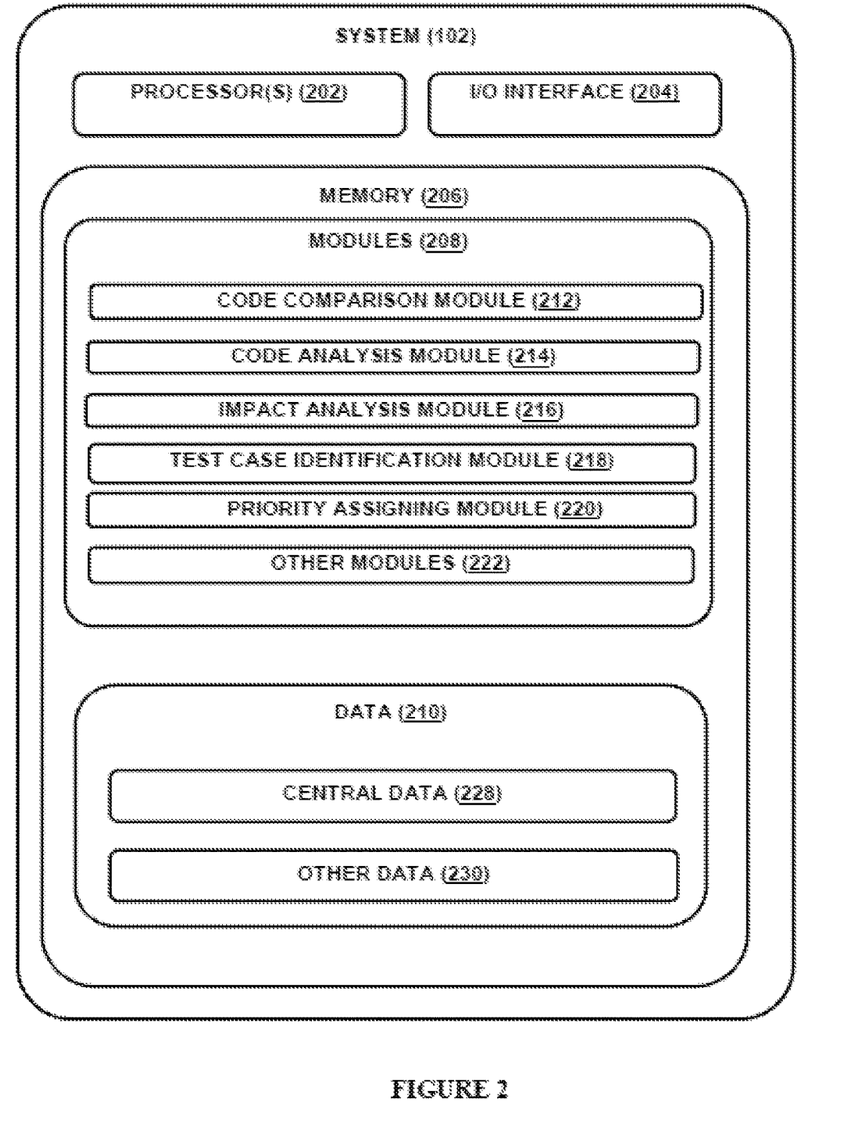
FIG. 2 illustrates the system configured to generate a test suite for regression testing, in accordance with an embodiment of the present subject matter.

Referring now to FIG. 2, the system 102 configured to generate a test suite for regression testing is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a code comparison module 212, a code analysis module 214, an impact analysis module 216, a test case identification module 218, a priority assignment module 220, and other modules 222. The other modules 222 may include programs or coded instructions that supplement applications and functions of the system 102.

The data 210, amongst other things, serve as a repository for storing data processed, received, and generated by one or more of the modules 208. The data 210 may also include a central data 228, and other data 230. In one embodiment, the other data 230 may include data generated as a result of the execution of one or more modules in the other modules 222.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

Code Comparison Module 212

In one embodiment, the code comparison module 212 may be configured to compare a set of current code blocks/methods with a set of historical code blocks/methods to identify a set of modified code blocks from the set of historical code blocks. The set of current code blocks may correspond to a current build of a software application and the set of historical code blocks correspond to at least one historical build of the software application. In one embodiment, the set of current code blocks and the set of historical code blocks may correspond to one of a module, a method, or one or more lines of code. In one embodiment, the code comparison module 212 may be configured to compare source code associated with the set of current code blocks and set of historical code blocks to identify the set of modified code blocks.

Code Analysis Module 214

Further, the code analysis module 214 is configured to analyse the set of modified code blocks to determine a type of modification associated with each modified code block. In one embodiment, the type of modification corresponds to one of a newly added type, a modified type, a renamed type, and a change in abstraction level type. More specifically the type of modifications may correspond to:
  a. The newly added code blocks/methods: Methods available in current build, but not in historical builds
  b. Modified code blocks/methods: Methods available in both historical and current builds
  c. Deleted Methods: Methods available in historical builds but not in current build In one embodiment, the set of current code blocks are compared with a set of historical code blocks based on a code change analysis engine. The code change analysis engine may perform code change analysis based on line by line comparison of the code blocks.

Impact Analysis Module 216

Further, the impact analysis module 216 is configured to determine a set of impacted code blocks from the set of modified code blocks based on analysis of the type of modification associated with each modified code blocks. In one embodiment, each modified code block is analysed based on a code impact analysis engine. The code impact analysis engine may be configured to determine the classify the set of modified code block as:

Comments only changes: In the changed methods, if the changes are only in comment lines, priority of the test cases associated with these changed methods can be relatively low as it will not affect any functionality. Also in this case there is no need to add new test cases for these methods.

Declaration Changes: In the changed methods, if the changes are only in declaration(s) of one/some elements, priority of the test cases associated with these changed methods can be relatively low as it will not affect any functionality. Also in this case there is no need to add new test cases for these methods.

Changes in Exception: In the changed methods, if the changes are only in exception sections, the impact will be on negative test cases. Positive test cases may not have any impact. Hence, priority the test cases associated with these changed methods can be deciding accordingly. Also in this case, new cases to be added only for negative scenario.

Changes in definition: In the changed methods, if the changes are only in definition sections, the impact will be on functionality. Hence Positive test cases need to consider as impacted. Hence, priority of the test cases associated with these changed methods can be deciding accordingly. Also in this case, new cases are needed to be added for positive scenario.

Test Case Identification Module 218

Further, the test case identification module 218 is configured to identify a subset of test cases from a set of test cases based on analysis of the set of impacted code blocks. In one embodiment, the set of test cases is configured to test the set of modified code blocks and the subset of test cases is configured to test the set of impacted code blocks. In other words, only a subset of test cases associated with the set of impacted code blocks is considered or testing the current build.

Priority Assigning Module 220

Further, the prioritization module 220 is configured to prioritize the subset of test cases based on the type of modification associated with each impacted code block. Based on the prioritization, a regression test suite is generated for regression testing of the current build. The subset of test cases is prioritized based on the type of modification associated with each impacted code block and predefined parameters specified by the user. The predefined parameters may be derived based on the objective of testing the current build. For example, if the testing is only associated with the UI/UX the predefined parameters may be selected based on correlation of the test cases with UI/UX testing. Further, method to generate a test suite for regression testing is illustrated with respect to FIG. 3.

Figure 3:
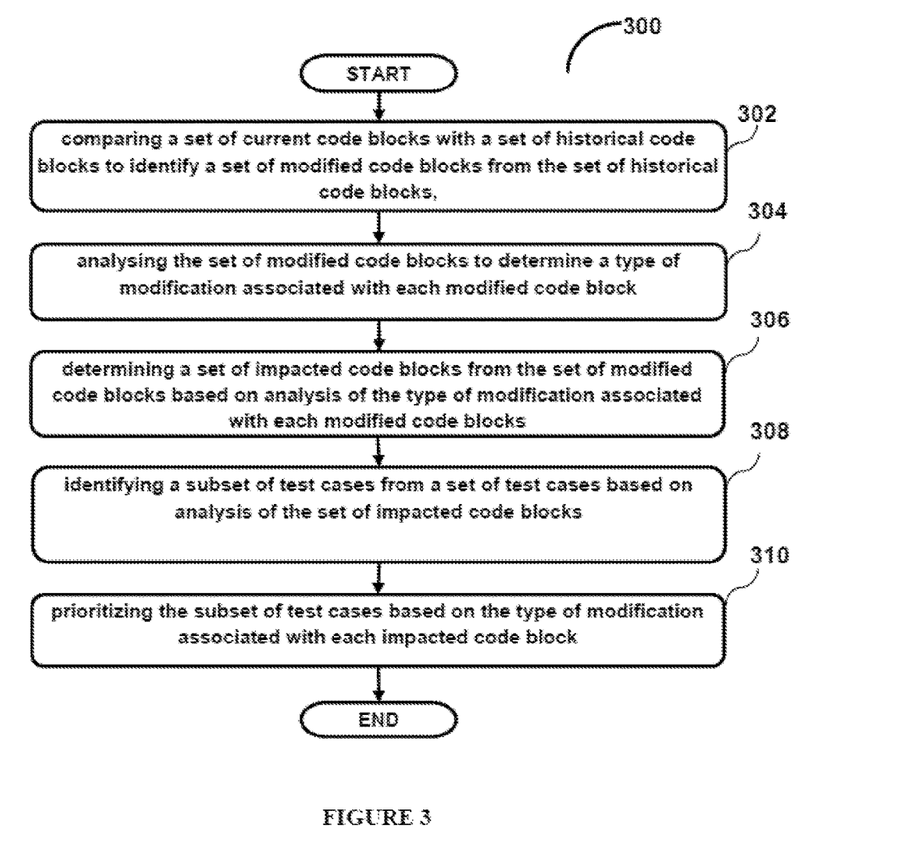
FIG. 3 illustrates a method to generate a test suite for regression testing, in accordance with an embodiment of the present subject matter.

Referring now to FIG. 3, a method 300 to generate a test suite for regression testing, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the code comparison module 212 may be configured to compare a set of current code blocks/methods with a set of historical code blocks/methods to identify a set of modified code blocks from the set of historical code blocks. The set of current code blocks may correspond to a current build of a software application and the set of historical code blocks correspond to at least one historical build of the software application. In one embodiment, the set of current code blocks and the set of historical code blocks may correspond to one of a module, a method, or one or more lines of code. In one embodiment, the code comparison module 212 may be configured to compare source code associated with the set of current code blocks and set of historical code blocks to identify the set of modified code blocks.

At block 304, the code analysis module 214 is configured to analyse the set of modified code blocks to determine a type of modification associated with each modified code block. In one embodiment, the type of modification corresponds to one of a newly added type, a modified type, a renamed type, and a change in abstraction level type. More specifically the type of modifications may correspond to:

a. The newly added code blocks/methods: Methods available in current build, but not in historical builds
b. Modified code blocks/methods: Methods available in both historical and current builds
c. Deleted Methods: Methods available in historical builds but not in current build In one embodiment, the set of current code blocks are compared with a set of historical code blocks based on a code change analysis engine. The code change analysis engine may perform code change analysis based on line by line comparison of the code blocks.

At block 306, the impact analysis module 216 is configured to determine a set of impacted code blocks from the set of modified code blocks based on analysis of the type of modification associated with each modified code blocks. In one embodiment, each modified code block is analysed based on a code impact analysis engine. The code impact analysis engine may be configured to determine the classify the set of modified code block as:

Comments only changes: In the changed methods, if the changes are only in comment lines, priority of the test cases associated with these changed methods can be relatively low as it will not affect any functionality. Also in this case there is no need to add new test cases for these methods:

Declaration Changes: In the changed methods, if the changes are only in declaration(s) of one/some elements, priority of the test cases associated with these changed methods can be relatively low as it will not affect any functionality. Also in this case there is no need to add new test cases for these methods.

Changes in Exception: In the changed methods, if the changes are only in exception sections, the impact will be on negative test cases. Positive test cases may not have any impact. Hence, priority the test cases associated with these changed methods can be deciding accordingly. Also in this case, new cases to be added only for negative scenario.

Changes in definition: In the changed methods, if the changes are only in definition sections, the impact will be on functionality. Hence Positive test cases need to consider as impacted. Hence, priority of the test cases associated with these changed methods can be deciding accordingly. Also in this case, new cases are needed to be added for positive scenario.

At block 308, the test case identification module 218 is configured to identify a subset of test cases from a set of test cases based on analysis of the set of impacted code blocks. In one embodiment, the set of test cases is configured to test the set of modified code blocks and the subset of test cases is configured to test the set of impacted code blocks. In other words, only a subset of test cases associated with the set of impacted code blocks is considered or testing the current build.

At block 310, the prioritization module 220 is configured to prioritize the subset of test cases based on the type of modification associated with each impacted code block. Based on the prioritization, a regression test suite is generated for regression testing of the current build. The subset of test cases is prioritized based on the type of modification associated with each impacted code block and predefined parameters specified by the user. The predefined parameters may be derived based on the objective of testing the current build. For example, if the testing is only associated with the UI/UX the predefined parameters may be selected based on correlation of the test cases with UI/UX testing.

Although implementations for systems and methods to generate a test suite for regression testing have been described, it is to be understood that the appended claims are not necessarily limited to the specific features or methods described. Rather, the specific features and methods are disclosed as examples of implementations to generate a test suite for regression testing.

We claim:

1. A system to generate a test suite for regression testing, the system comprising:
   a memory; and
   a processor coupled to the memory, wherein the processor is configured to execute programmed instructions stored in the memory for:
   comparing a set of current code blocks with a set of historical code blocks to identify a set of modified code blocks from the set of historical code blocks, wherein the set of current code blocks corresponds to a current build of a software application, and wherein the set of historical code blocks corresponds to at least one historical build of the software application;
   analyzing the set of modified code blocks to determine a type of modification associated with each modified code block;
   determining a set of impacted code blocks from the set of modified code blocks based on analysis of the type of modification associated with each modified code block;
   identifying a subset of test cases from a set of test cases based on analysis of the set of impacted code blocks, wherein the set of test cases is configured to test the set of modified code blocks, and wherein the subset of test cases is configured to test the set of impacted code blocks; and
   prioritizing the subset of test cases based on the type of modification associated with each impacted code block thereby generating a regression test suite for regression testing of the current build.

2. The system of claim 1, wherein the code blocks correspond to one of: a module, a method, or a line of code.

3. The system of claim 1, wherein the type of modification corresponds to one of: a newly added type, a modified type, a renamed type, or a change in abstraction level type.

4. The system of claim 1, wherein the set of current code blocks is compared with a set of historical code blocks based on a code change analysis engine.

5. The system of claim 1, wherein each modified code block is analyzed based on a code impact analysis engine.

6. The system of claim 1, wherein the subset of test cases is prioritized based on the type of modification associated with each impacted code block and by predefined parameters specified by the user.

7. A method to generate a test suite for regression testing, the method comprising:
   comparing, by a processor, a set of current code blocks with a set of historical code blocks to identify a set of modified code blocks from the set of historical code blocks, wherein the set of current code blocks corresponds to a current build of a software application, and wherein the set of historical code blocks corresponds to at least one historical build of the software application;
   analyzing, by the processor, the set of modified code blocks to determine a type of modification associated with each modified code block;
   determining, by the processor, a set of impacted code blocks from the set of modified code blocks based on analysis of the type of modification associated with each modified code block;
   identifying, by the processor, a subset of test cases from a set of test cases based on analysis of the set of impacted code blocks, wherein the set of test cases is configured to test the set of modified code blocks, and wherein the subset of test cases is configured to test the set of impacted code blocks; and
   prioritizing, by the processor, the subset of test cases based on the type of modification associated with each impacted code block thereby generating a regression test suite for regression testing of the current build.

8. The method of claim 7, wherein the code blocks correspond to one of: a module, a method, or a line of code.

9. The method of claim 7, wherein the type of modification corresponds to one of: a newly added type, a modified type, a renamed type, or a change in abstraction level type.

10. The method of claim 7, wherein the set of current code blocks are compared with a set of historical code blocks based on a code change analysis engine.

11. The method of claim 7, wherein each modified code block is analyzed based on a code impact analysis engine.

12. The method of claim 7, wherein the subset of test cases is prioritized based on the type of modification associated with each impacted code block and predefined parameters specified by the user.

13. A computer program product having embodied thereon a computer program to generate a test suite for regression testing, the computer program product comprising:
   a program code for comparing a set of current code blocks with a set of historical code blocks to identify a set of modified code blocks from the set of historical code blocks, wherein the set of current code blocks corresponds to a current build of a software application, and wherein the set of historical code blocks corresponds to at least one historical build of the software application;
   a program code for analyzing the set of modified code blocks to determine a type of modification associated with each modified code block;

a program code for determining a set of impacted code blocks from the set of modified code blocks based on analysis of the type of modification associated with each modified code block;

a program code for identifying a subset of test cases from a set of test cases based on analysis of the set of impacted code blocks, wherein the set of test cases is configured to test the set of modified code blocks, and wherein the subset of test cases is configured to test the set of impacted code blocks; and a program code for prioritizing the subset of test cases based on the type of modification associated with each impacted code block thereby generating a regression test suite for regression testing of the current build.

* * * * *